United States Patent [19]
Oliver et al.

[11] Patent Number: 4,578,536
[45] Date of Patent: Mar. 25, 1986

[54] CENTERPOINT AUTOMATIC METER READING SYSTEM

[75] Inventors: Stewart W. Oliver, Venice; John Cosgrove, Playa del Rey, both of Calif.

[73] Assignee: International Teldata Corp, Las Vegas, Nev.

[21] Appl. No.: 543,372

[22] Filed: Oct. 19, 1983

[51] Int. Cl.⁴ .......................................... H04M 11/00
[52] U.S. Cl. .............................................. 179/2 AM
[58] Field of Search ............... 179/2 A, 2 AM, 2 DP; 340/870.02, 870.03, 870.24, 870.11–870.14

[56] References Cited

U.S. PATENT DOCUMENTS

| | | | |
|---|---|---|---|
| 3,842,206 | 10/1974 | Barsellotti et al. | 179/2 AM |
| 3,868,640 | 2/1975 | Binnie et al. | 179/2 AM |
| 3,939,304 | 2/1976 | Ribes | 375/22 |
| 4,366,348 | 12/1982 | Pope | 179/84 VF |

Primary Examiner—Gene Z. Rubinson
Assistant Examiner—W. J. Brady
Attorney, Agent, or Firm—John E. Wagner

[57] ABSTRACT

A utility meter reading system for sending utility usage information over a plurality of telephone lines is disclosed including a plurality of interface devices, at least one interface coupled to each of the telephone lines and each interface coupled to at least one utility usage monitor for receiving usage information therefrom and for sending alternating current representations of the usage information over its discrete telephone line responsive to receiving at least one distinct alternating current interrogation signal from its discrete telephone line, a multiplexer for sending at least one distinct alternating current interrogation signal over each of the plurality of telephone lines, the interface receiving the plurality of alternating current representations of the usage information, a receiver for converting the alternating current representations into a plurality of digital representations, each representing usage information from a single utility usage monitor, and a processor for communicating the plurality of digital representations to an external digital interfacing device.

5 Claims, 5 Drawing Figures

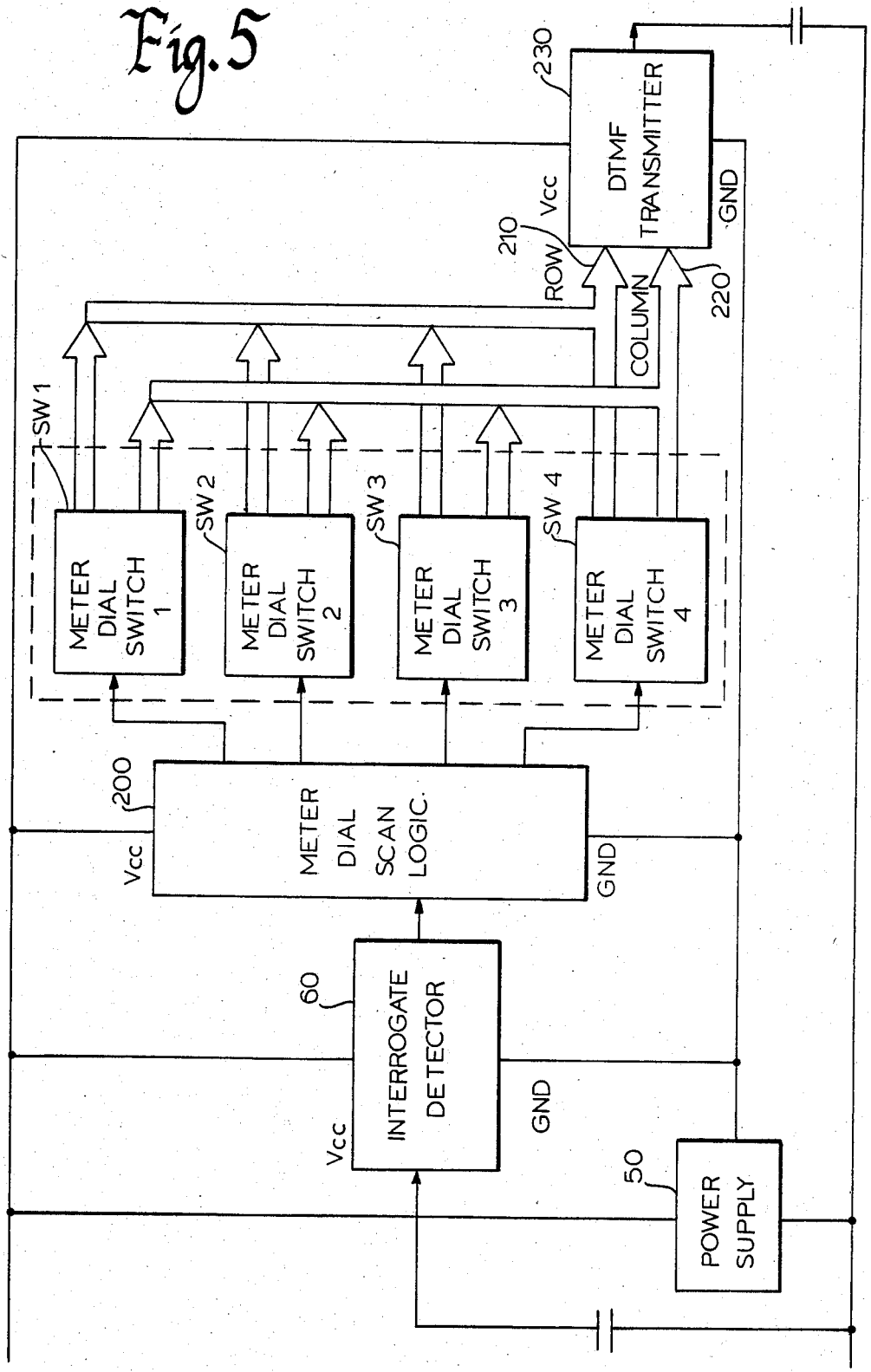

CENTERPOINT AUTOMATIC METER READING SYSTEM

BACKGROUND OF THE INVENTION

The present invention is a method and apparatus for receiving utility usage information over a plurality of telephone lines and more particularly a method and apparatus for receiving utility usage information in the form of alternating current representations from a plurality of interface devices, each interface device being coupled to both a distinct telephone line and to at least one utility monitoring device.

There have been other systems for receiving data from telephone lines such as the one described in U.S. Pat. No. Re. 26,331 to Dumont et al. Systems of the Dumont type use the telephone company's leakage testing system to call up individual meter installations. Once a meter installation is called up, it sends the meter information over the telephone line to a central telephone office, however, such systems have several disadvantages which make their systems undesirable for its intended use.

First, such systems require the use of a telephone company's leakage testing system to be operable and such leakage testing system can change, requiring an additional large investment in new equipment configured to the new leakage testing system. As well, not all telephone companies have the same type of leakage testing equipment, so that numerous configurations of the meter reading system must be devised to fit the numerous types of leakage testing equipment.

Second, such systems require a power supply, powered either from the power available at the meter installation site or from battery power for each of its meter installations. This requirement of a power supply makes such systems costly, difficult to service, and makes the systems prone to failures due to common power outages at the installation site.

Third, the Dumont invention requires synchronous data output on the telephone line. The synchronous output requires that the meter installations send additional sync data over the telephone line. In the event that either the sync data or synchronous meter data is momentarily interrupted by even a short noise pulse, which is quite common on telephone lines, the meter data will be lost.

Another system which has been used to send data over a telephone line is found in U.S. Pat. No. 3,922,490 to Pettis. The Pettis invention is a direct current system where several resistances are switched across tip and ring of the telephone line. The current drawn by the several different combinations of resistances connected to the telephone line are sensed at a central telephone office and any of several conditions are thus communicated. Typically, in the Pettis invention, the least significant digit pointer of a utility meter makes or breaks a switch depending on which half of its rotation the pointer is presently located. The making or breaking of the switch causes the resistance across the telephone line to change. This change is sensed at the central office and the cumulative count of changes in transition are totaled and the meter reading determined therefrom.

Of course, the Pettis invention, being a D.C. system, does not relate at all to the applicant's invention which is a method and apparatus for receiving data sent in the form of alternating current signals over a plurality of telephone lines.

U.S. Pat. No. 4,180,709 to Cosgrove et al also describes a system for enabling the monitoring of a plurality of resistances placed across the D.C. telephone line. As with U.S. Pat. No. 3,922,490, this invention relates only to monitorng data conducted by D.C. current changes and does not relate at all to the applicant's invention which monitors A.C. signals from the telephone line.

None of the art described has been able to continuously monitor each of a plurality of telephone lines with a low impedance to the A.C. data signals sent and received; none of the art described has been able to receive data from interface devices which are powered from the telephone line; none of the art described has been able to receive A.C. data which is asynchronous; and, none of the art described has sent utility usage information using dual-tone signals.

SUMMARY OF THE INVENTION

The method and apparatus of the present invention is a utility meter reading system for sending utility usage information over a plurality of telephone lines comprising a plurality of interface means, at least one interface means coupled to each of the telephone lines and each interface means coupled to at least one utility usage monitor for receiving usage information therefrom and for sending alternating current representations of the usage information over its discrete telephone lines responsive to receiving at least one distinct alternating current interrogation signal over each of the plurality of telephone lines; a means for receiving the plurality of alternating current representations into a plurality of digital representation, each digital representation being a digital representation of usage information from a single utililty usage monitor; and, a means for communicating the plurality of digital representations to an external digital interfacing device.

The interfacing means may comprise a meter interface device which includes a means for powering the meter interface device from its telephone line, the meter interface device drawing an amount of ON-HOOK telephone line current which sustains the telephone line in the ON-HOOK condition during the sending of the alternating current representations. This means for powering the meter interface device may also include means for disabling the meter interface when its telephone line is in the OFF-HOOK condition. The interrogation signal which triggers a particular meter device typically comprises a burst of a single audio tone having a frequency of between 300 and 3200 Hertz.

The meter interface device may send the alternating current representations as a series of pulses of a pulse width modulated single audio tone, the pulses having at least two different pulse periods. The means for converting the alternating current representations into digital representations may comprise a means for deriving a series of direct current, positive voltage pulses which are proportional in pulse period duration to the pulse period duration of the series of pulses of the single audio tone; and, a means for deriving a series of zero voltage transitions which are proportional in duration to the duration of the transition periods between the pulse periods of the series of pulses of the single audio tone. These proportional positive voltage pulses and zero voltage transitions may then be decoded in a processor circuit. The result of the decoding is a series of digital signals which represent the usage information from the meter interface devices. The usage information typically comprises a current utility usage figure, meter identification figure and at least one sentinel figure.

Instead of a pulse width modulated single audio tone, the alternating current representations may be in the form of a series of dual-tone signals which represent a utility usage figure and a meter identification figure, there being at least twelve distinct dual-tone signals, each distinct dual-tone signal representing the following: a digit value between the including 0 to 9, a first framing sentinel and a second framing sentinel.

BRIEF DESCRIPTION OF THE DRAWINGS

This invention may be more clearly understood from the following detailed description and by reference to the drawing in which:

FIG. 5 is an electrical block diagram of an alternate embodiment of the meter interface device of the present invention.

DETAILED DESCRIPTION OF THE INVENTION

Figure 1:
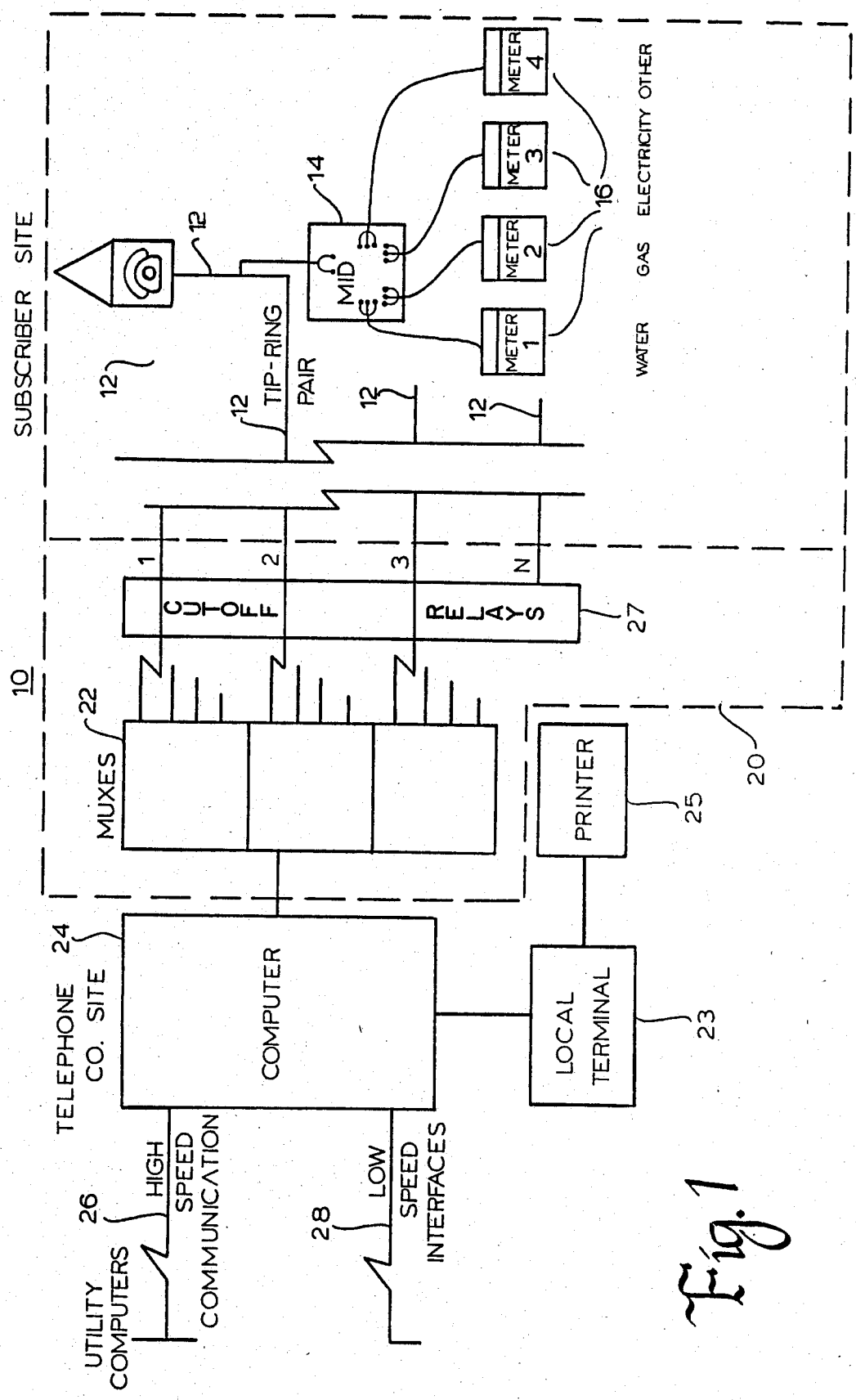
FIG. 1 is an electrical block diagram of the utility meter reading system of the present invention.

Referring to FIG. 1, the present invention is an apparatus and method for reading utility meters over telephone lines 12 and more particularly with receiving alternating current representations of utility usage information from a plurality of meters 16 via interface devices 16, typically located at a subscriber's site. The sending of the alternating current representations from each of the meter interface devices 14 to the telephone company site is responsive to receiving a particular distinct interrogation signal from the telephone central office 20 multiplexer system. A detailed description of a suitable meter interface device may be found in co-pending application Ser. No. 502,201 filed June 8, 1983, for a Meter Interface Device for An Automatic Meter Reading System. A detailed description of the multiplexer system 20 may be found in co-pending application Ser. No. 544,110 filed Oct. 21, 1983, for a Multiplexing System for An Automatic Meter Reading System.

The alternating current representations of meter 16 readings from the meter interface devices 14 are received by at least one multiplexer device 22 in the multiplexer system 20 which converts the alternating current representations into digital representations and typically sends the digital representations to a computer 24.

The multiplexer system 20 is typically located in the central office of a telephone company. The telephone company may access the usage information in the computer by local terminal 23 and printer 25. The usage information in the computer 24 may also be sent to other locations via high speed or low speed data lines 26 and 28. The multiplexer devices 22 are typically connected to the plurality of telephone lines 12 at a point past the cut-off relays 27 so that there is a continuous coupling to the telephone lines 12 even when the telephone lines 12 are in the OFF-HOOK condition, although any point of access to either one or both sides of the line is acceptable.

Meter Interface Device

Figure 2:
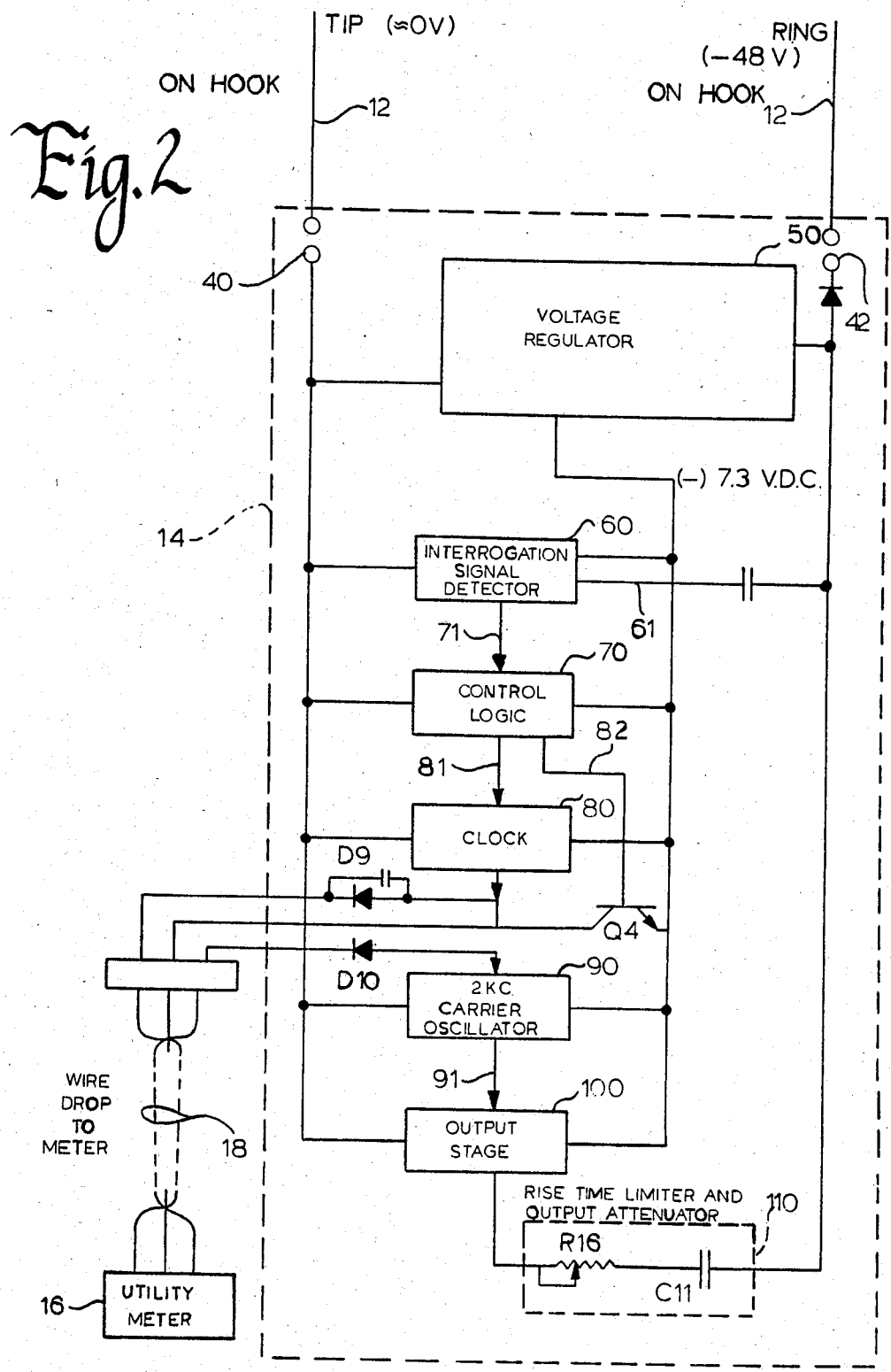
FIG. 2 is an electrical block diagram of the preferred embodiment of the meter interface device of the present invention.

Referring to FIG. 2, the preferred embodiment of the meter interface device 14 is shown. The meter interface device 14 typically is powered by the telephone line 12 through power supply 50. This power supply 50 may be configured to cause the meter interface device 14 to become inoperative during the OFF-HOOK conditions on the telephone line 12. Also, the device can only conduct ON-HOOK battery current in a unipolar fashion allowing precise line leakage measurements to still be made using a reverse battery, (i.e. ring conductor positive with respect to tip conductor.) An interrogation signal detector circuit 60 is used to respond to the reception of a particular distinct interrogation signal sent over the telephone line 12. When the particular distinct interrogation signal is received by the interrogation signal detector circuit 60, a signal is sent to the control logic circuit 70 which, in turn, powers the utility monitoring device 16 through transistor Q4 and starts the clock circuit 80 outputting clock signals to the utility monitoring device 16.

The output of the utility monitoring device 16 will typically pulse width modulate a single audio carrier from carrier oscillator circuit 90. The frequency of the carrier produced in the carrier oscillator circuit 100 found to be most advantageous is 2000 Hertz. This 2000 Hertz frequency is in the mid-range of the bandpass of most telephone company equipment and yet of a frequency sufficiently high to allow a reasonably fast data rate. The pulse width modulated single audio tone is amplified and coupled to the telephone line 12 by output stage 100 and rise time limiter and output attenuator 110.

The preferred embodiment of the meter interface device 14 is configured to be interfaceable with a water meter of the type described in U.S. Pat. No. 4,085,287 to Kullman et al, herein incorporated by reference. Suffice it to say that the Kullman water meter monitors water usage by the position of four rotary switches. The position of each of these switches is sent to an output line as pulse width modulated digital signals (see FIG. 8 of Kullman). The digital signals represent digit values of a usage figure, meter identification figure and sentinel figures. The meter interface device 14 sends these figures as alternating current representations. However, it must be noted that the preferred embodiment of the meter interface device 14 can be configured to interface to virtually all utility monitoring devices.

Figure 3:
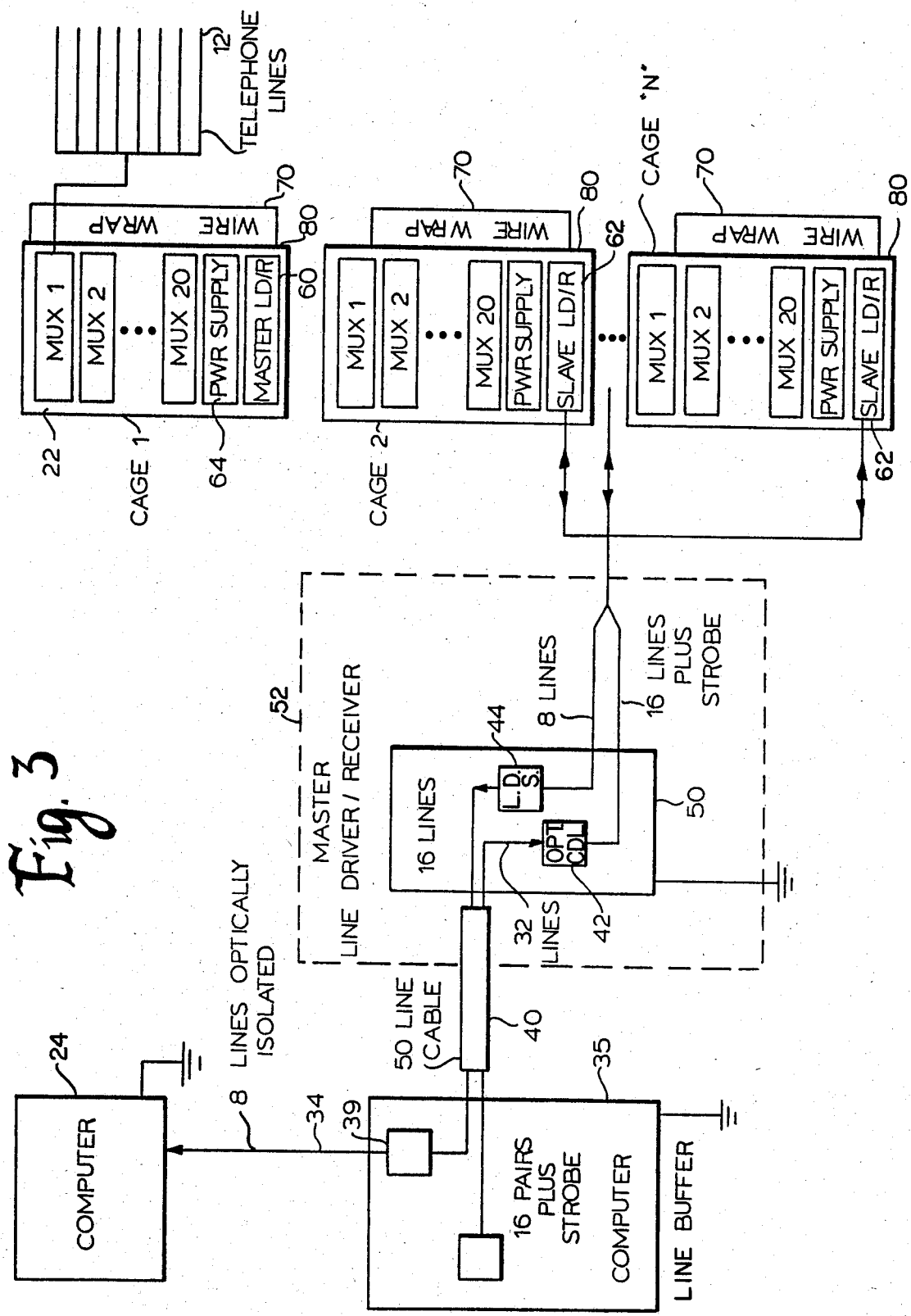
FIG. 3 is an electrical block diagram of the preferred embodiment of the multiplexing system of the present invention.

Now referring to FIG. 3, the multiplexer system 20 is seen. The multiplexer system 20 typically has a computer line buffer 35 which can interface the multiplexer system 20 to a computer 24 or other parallel digital interfacing devices. The computer line buffer 35 typically interfaces a 16 bit plus a strobe out-going line 32 from the computer 24 and an 8 bit incoming line 34 to the computer 24. The 16 bit out-going line 32 carries control signals which, among other tasks, tell the multiplexer devices 22 to interrogate a particular subscriber's telephone line 12.

The 16 bits are broken down first into 8 MUX select bits which allow the computer 24 to access 256 different multiplexer devices 22. Each multiplexer device 22 can typically receive data from 50 double-ended telephone lines 12 or 100 single-ended telephone lines 12. An additional 7 bits of the 16 bit signals from the computer 24 are typically used for individual telephone line select codes. The remaining bit of the 16 plus the strobe are used for handshaking between the digital interface device and the multiplexer device.

The 100 telephone lines connected to each muliplexer device 22 can, therefore, be individually accessed and controlled by the computer 24 by selecting the proper telephone line select code. Thus, it can be seen that computer 24 can access up to 25,600 telephone lines in the preferred embodiment of the multiplexer system 20. As well, each telephone line 12 may have a plurality of meter interface devices 14 coupled to it, and, each meter interface device 14 can have a plurality of utility usage monitors 16 coupled to it. Since a plurality of distinct interrogation signals can be sent over every coupled telephone line 12 by the multiplexing system 20, well over a 100,000 individual meter readings can be read by the preferred embodiment of the multiplexer system 20.

Since the preferred embodiment of the multiplexer system 20 can be coupled to a maximum of 100 telephone lines 12, there are 28 different telephone line select codes left which can be used as control codes to the processor circuit 120 (shown in FIG. 4) of the multiplexer device 22. The remaining 1 bit is typically used as a MUX reset command which will cause the software in any particular multiplexer device 22 to re-initialize and ready itself for another meter reading attempt.

Since the computer 24 is typically located some distance away from the cages 80 which house the multiplexer devices 22, the signals to and from the computer 24 will have to travel over a relatively long distance. To prevent loss of signals and increased noise susceptability over the long distance, each of the 16 bit out-going and 8 bit incoming lines 32 and 34 are amplified before entering the cable 40 and optically coupled at its intended receiving point. The 16 bit signals plus the strobe on the 16 bit out-going line 32 are amplified by line driver stage 37 and optically coupled to optical coupler stage 42 in the master line driver/receiver 52. The 8 bit lines from the slave line driver/receiver 62 are line amplified by line driver stage 44 in the master line driver/receiver 52 and optically coupled in optical coupler stage 39 in the computer line buffer 35.

Typically, each cage 80 can house twenty multiplexer devices 22 along with a power supply 64 and the slave line driver/receiver 62. However, since each cage 80 shares a single I/O line 54 from the master line driver/receiver 52, in order to drive the twenty multiplexer devices 22 in each cage 80, the signal levels must be boosted. The boosting of the signal levels is done in each of the slave line driver/receivers 62.

Typically, each cage 80 has a wire-wrap section 70 which allows a standardized multiplexer device 22 to be installed in each position in the cage 80 and instantly acquire the necessary distinct hardwiring which tells the multiplexer device 22 which one it is in the overall picture of the plurality of multiplexer devices 22 and tells the multiplexer device 22 whether it is in the single or double ended configuration.

Figure 4:
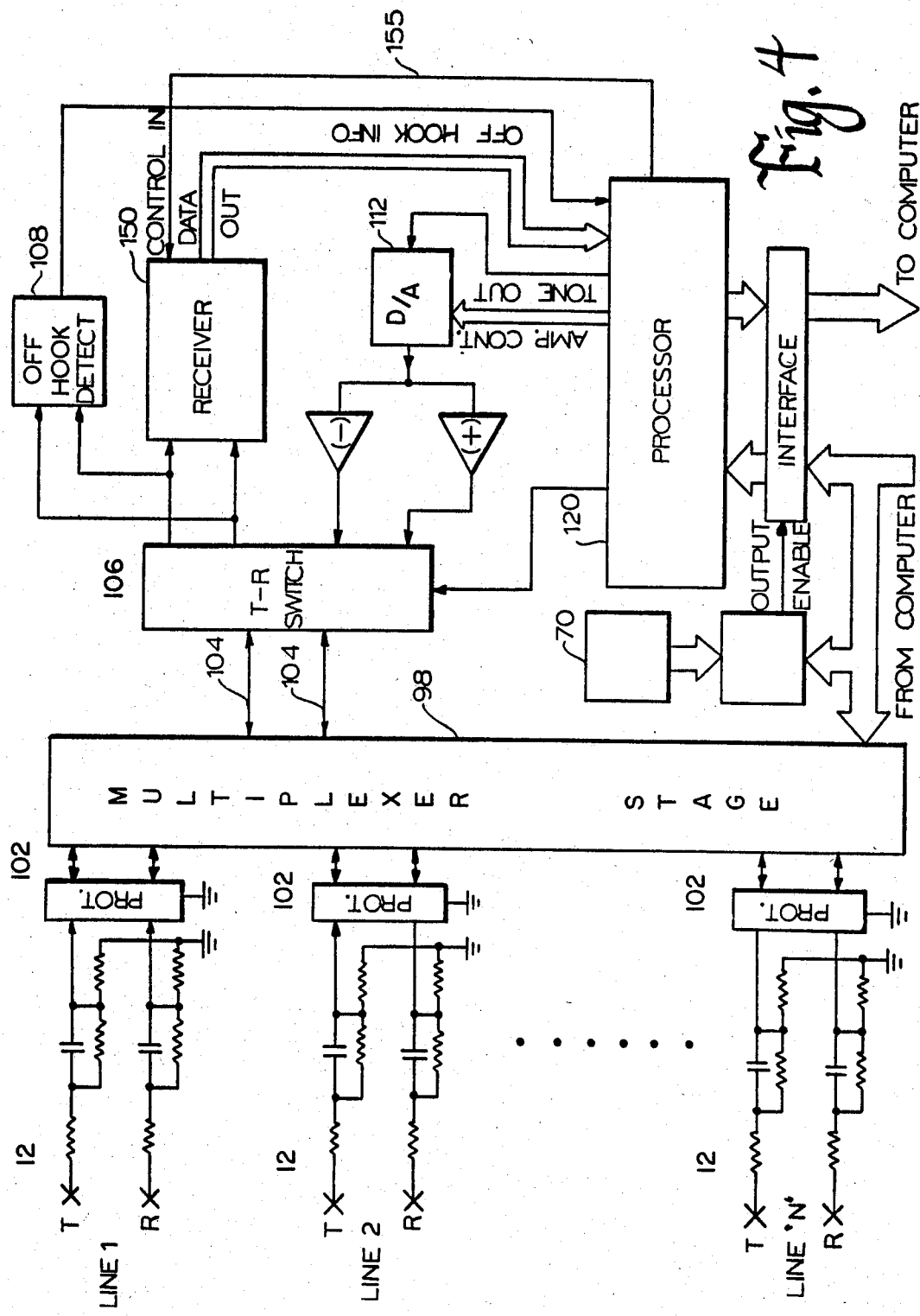
FIG. 4 is an electrical block diagram of the preferred embodiment of the multiplexer device of the present invention.

Referring to FIG. 4, a typical multiplexer device 22 is seen. The telephone lines 12 are connected to input circuits 102 which protect the multiplexer device 22 from high voltage conditions on the telephone line 12, provide a low impedance path to audio signals to and from the multiplexer device 22 and allow a small direct current leakage to enter the multiplexer device 22 from the telephone line 12 to allow the sensing of an OFF-HOOK condition on the telephone line 12.

Each of the telephone lines 12 are de-multiplexed to a single transmit/receive line 104, and, transmit/receive line 104 is also multiplexed to the proper telephone line by the multiplexer stage 98 under the control of the processor circuit 120 which, in turn, is commanded by the computer 24 or FIG. 2. Signals received or sent over the telephone lines 12 are switched by transmit and receive switch 106 under the control of the processor circuit 120.

Since a small amount of direct current is leaked to the multiplexer device 22, OFF-HOOK detector circuit 108 can detect an OFF-HOOK condition by sensing a dramatic drop in voltage from the voltage appearing on the telephone line in the ON-HOOK condition.

The received alternating current representations from the meter interface devices 14 are processed in receiver circuit 150. As in the preferred embodiment of the meter interface device 14, the alternating current representations are in the form of a series of pulses of a pulse width modulated carrier. The receiver 150 filters the representation and converts them into positive, direct current digital pulses which have pulse periods proportional to the pulse periods of the pulses of the pulse width modulated carrier. These digital pulses are sent to the processor circuit 120 for further decoding and extensive software filtering. Once decoded, the usage figure and meter identification figure are sent to the computer 24 as a series of binary digital words. If the alternating current representations are in the form of dual-tone signals, as they are in the alternate embodiment of the meter interface devices 14, then the receiver 150 decodes the usage information into a series of digital words which are sent to the computer 24 via the processor 120.

The multiplexer device 22 typically sends the interrogation signal as a tone burst of a single frequency between 300 and 3200 Hertz. In the preferred embodiment, the processor 120 creates the interrogation signals, and the frequencies of 500 Hertz, 810 Hertz and 1270 Hertz have been found to operate satisfactorily with telephone company equipment. Each of these distinct frequencies can activate a separate meter interface device on the same line. Each master interface device can sequentially send usage data for a multiple of usage monitoring devices enabling each phone line to communicate usage data for many separate monitoring devices. The current embodiment has four meter interface devices or a capacity of twelve per line. The tone burst, generated in the processor circuit 120, is controlled in amplitude by the processor 120 in D/A converter 112. The analog tone burst signal is then amplified and switched to the appropriate telephone line 12 via transmit receive switch 106 and multiplexer stage 98.

The utility usage information from the meter interface devices 22 typically comprises a current utility usage figure and a meter identification figure. These are sent to the computer 24 via the slave line driver/receiver 62, master line driver/receiver 52 and computer line buffer 35.

Alternate Meter Interface Device

Referring to FIG. 5, the alternate embodiment of the meter interface device 14 is seen. The configuration in FIG. 5 is shown interfaced to the Kullman type water meter of U.S. Pat. No. 4,085,287, however, as previously noted, virtually any utility monitoring device may be interfaced to the meter interface device 14. The alternate embodiment of the meter interface device 14 differs from the preferred embodiment of FIG. 2 in that the meter switches in the Kullman water meter are scanned by the meter dial scan logic circuit 200 so that the DTMF transmitter 230 will send a distinct dual-tone signal for each digit of the Kullman water meter indicated by the switch positions on the row 210 and column 220 lines. These dual-tone signals are then sent over the telephone line 12.

It can be seen from the foregoing that the meter reading system 10 of the present invention has the advantages of flexibility in the sending and receiving of the utility usage information. The processor circuit 120 can decode numerous types of digital signals sent to it by the receiver stage 150 of FIG. 4. As well, the meter interface devices 14 can be interfaced to numerous types of utility monitoring devices and send decodable alternating current representations of the utility usage information. As described, the present invention can send, receive and decode asynchronous data over the telephone line.

The above described embodiments of the present invention are merely descriptive of its principles and are not to be considered limiting. The scope of the present invention instead shall be determined from the scope of the following claims, including their equivalents.

What is claimed is:

1. A utility meter reading system for sending utility usage information over a plurality of telephone lines to a telephone central office comprising:

a plurality of interface means, connected to serve a plurality of utility meter locations, at least one interface means coupled to each of the telephone lines and each interface means coupled to at least one utility usage monitor for receiving usage information therefrom and for sending alternating current representations of the usage information over its discrete telephone line to a telephone central office responsive to receiving at least one distinct alternating current interrogation signal from its discrete telephone line;

means establishing a continuous ON-HOOK direct current connection between said central office and said plurality of interface means via said telephone lines;

a plurality of multiplexer means at said central office continuously connected to a preselected group of said telephone lines for multiplexing signals communicated between said preselected group of telephone lines and said central office;

means at said telephone central office for sending at least one distinct alternating current interrogation signal via said multiplexer means to a plurality of said interface means over each of the plurality of telephone lines;

computer means for selecting each of a plurality of said multiplexer means;

said computer means selecting one of a plurality of telephone lines for receipt of said interrogation signal;

means at said central office for passing ON-HOOK direct current between said central office and said telephone lines whereby said system establishes continuous direct current and alternating current coupling to said telephone lines during ON-HOOK conditions;

means at said telephone central office for receiving the plurality of alternating current representations of utility usage information from said plurality of interface means;

means at said telephone central office for converting the alternating current representations into a plurality of digital representations, each digital representation being a digital representation of utility usage information from a single utility usage meter location; and, means for communicating the plurality of digital representations to a utility usage information device;

whereby said system allows the monitoring of any of a plurality of remote utility meters selectively under the control of a computer of any ON-HOOK telephone line without the necessity of dialing up any line.

2. The utility meter reading system in accordance with claim 1 in which the means at said central office for sending at least one distinct interrogation signal, means at said central office for receiving the plurality of alternating current representations, means for converting the alternating current representations into digital representations and the means for communicating the digital representations to the utility usage information utilization device comprise a transceiver device coupled to said multiplexer means which includes a means for storing at least one of the digital representations in a digital representation system.

3. The utility meter reading system in accordance with claim 1 in which said interface means generates the alternating current representations comprising a series of dual-tone signals which represent a utility usage figure and a meter identification figure, there being at least twelve distinct dual-tone signals, each distinct dual-tone signal representing the following: a digit value between and including 0 to 9, a first framing sentinel and a second framing sentinel.

4. A method of sending utility usage information over a plurality of telephone lines comprising the steps of:

direct current and alternating current coupling at least one meter interface device to each of the telephone lines, each of the meter interface devices being coupled to at least one utility usage meter for receiving usage information therefrom and for sending alternating current representations of the usage information over its discrete telephone line responsive to receiving at least one distinct alternating current interrogation signal from its discrete telephone line;

continuously powering the interface device during ON-HOOK conditions by ON-HOOK current on the telephone line;

multiplexing said alternating current representations of usage information and interrogation signals;

sending at least one distinct alternating current interrogation signal over each of the plurality of telephone lines;

receiving the plurality of alternating current representations of the usage information;

converting the alternating current representations into a plurality of digital representations, each digital representation being a digital representation of usage information from a single utility usage monitor; and communicating the plurality of digital representations to a utility usage information utilization device.

5. The method of sending utility usage information over a plurality of telephone lines comprising the steps of:

D.C. and A.C. coupling at least one meter interface device to each of the telephone lines, each of the meter interface devices being coupled to at least one utility usage meter for receiving usage information therefrom and for sending alternating current representations of the usage information over its discrete telephone line responsive to receiving at least one distinct alternating current interrogation signal from its discrete telephone line;

continuously powering the interface device by ON-HOOK current on the telephone line;

multiplexing said alternating current representations of usage information and interrogation signals;

sending at least one distinct alternating current interrogation signal over each of the plurality of telephone lines;

receiving the plurality of alternating current representations of the usage information;

converting the alternating current representations into a plurality of digital representations, each digital representation being a digital representation of usage information from a single utility usage monitor; and communicating the plurality of digital representations to an external digital interfacing device;

in which the alternating current representations comprise a series of dual-tones, each dual tone representing at least a single digit value between and including 0 and 9 and a first and second framing sentinel.

* * * * *